(12) United States Patent
Wooten et al.

(10) Patent No.: US 6,632,941 B2
(45) Date of Patent: Oct. 14, 2003

(54) METHOD OF EXTRACTING CHITIN FROM THE SHELLS OF EXOSKELETAL ANIMALS

(76) Inventors: James Wooten, P.O. Box 673, Bayou La Batre, AL (US) 36509; Norman S. Singer, 40 Ridge Rd., Highland Park, IL (US) 60035

( * ) Notice: Subject to any disclaimer, the term of this patent is extended or adjusted under 35 U.S.C. 154(b) by 0 days.

(21) Appl. No.: 09/954,492

(22) Filed: Sep. 14, 2001

(65) Prior Publication Data

US 2003/0060610 A1 Mar. 27, 2003

(51) Int. Cl.$^7$ .............................. C08B 37/08; C07H 1/06; C07H 1/08
(52) U.S. Cl. ......................... 536/127; 536/18.7; 536/20; 536/123.1; 536/124
(58) Field of Search ....................... 536/18.7, 20, 123.1, 536/124, 127, 112

(56) References Cited

U.S. PATENT DOCUMENTS

| | | | |
|---|---|---|---|
| 4,066,735 A | | 1/1978 | Peniston et al. |
| 4,199,496 A | * | 4/1980 | Peniston et al. ........ 260/112 R |
| 4,293,098 A | * | 10/1981 | Muralidhara ................ 241/19 |
| 4,297,164 A | | 10/1981 | Lee |
| 4,536,207 A | * | 8/1985 | McCandliss et al. ....... 504/292 |
| 5,053,113 A | | 10/1991 | Krepets et al. |
| 5,210,186 A | | 5/1993 | Mikalsen, deceased et al. |
| 5,705,634 A | | 1/1998 | Bredehorst et al. |

FOREIGN PATENT DOCUMENTS

| | | | | |
|---|---|---|---|---|
| JP | 5310804 | | 11/1993 | |
| WO | WO 85/00109 A1 | * | 1/1985 | .......... A61K/31/70 |
| WO | WO 86/06082 | | 10/1986 | |

OTHER PUBLICATIONS

Roer & Dillamen, "The Structure and Calcification of the Crustacean Cuticle", Amer. Zool., 1984, pp. 893–909, vol. 24.

Waterman, T.H, "Metabolism and Growth", The Physiology of Crustacea, Acad. Press, 1960, p. 449 1960.

Chang & Tsai, "Response Surface Optimization and Kinetics of Isolating Chitin from Pink Shrimp (*Solenocera melantho*) Shell Waste", J. Agric. Food Chem., 1997, pp. 1900–1904, vol. 45.

Kawaguti & Ikemoto, "Electron Microscopy of the Integumental Structure and its Calcification Process during Molting in a Crayfish", Biology Journal Okayama Univ., 1962, pp. 43–58, vol. 8.

No & Myers, "Preparation and Characterization of Chitin and Chitosan—A Review", J. Aquatic Food Product Technol., 1995, pp. 27–41, vol. 4.

Roer & Dillamen, "The Structure and Calcification of the Crustacean Cuticle", Amer. Zool., 1984, pp. 893–909, vol. 24.

Waterman, T.H, "Metabolism and Growth", The Physiology of Crustacea, Acad. Press, 1960, p. 449.

U.S. Census Bureau, "No. 1159 U.S. Private Aquaculture—Trout and Catfish Production Value: 1990 to 1999", Statistical Abstract of the United States, 2000, Natural Resources, p. 693.

* cited by examiner

*Primary Examiner*—James O. Wilson
*Assistant Examiner*—Josephine Young
(74) *Attorney, Agent, or Firm*—Dennis G. LaPointe; Mason Law, P.A.

(57) ABSTRACT

Chitin is extracted from the shells of exoskeletal animals such as crab, shrimp, crayfish, and lobster, by a primarily physical process comprising the step of cutting the shells in a wet state to approximately uniform particles. The resultant mass is then diluted and mixed to form a pumpable slurry. The slurry is separated to remove most unwanted materials, after which the particle size of the concentrated chitinous residue is further reduced. The once-washed, finely-cut chitinous slurry is again separated, resulting in a chitin end product.

26 Claims, 2 Drawing Sheets

METHOD OF EXTRACTING CHITIN FROM THE SHELLS OF EXOSKELETAL ANIMALS

FIELD OF THE INVENTION

The present invention relates generally to the extraction of chitin from the exoskeletons of any exoskeletal animal. More specifically, it refers to the extraction of chitin from the exoskeletons of marine crustaceans, such as crab, shrimp, crayfish, and lobster. More specifically, the present invention relates to a primarily physical process of efficiently extracting chitin from exoskeletons, which is economical in its energy requirements, and substantially minimizes the use of harsh chemicals and the associated risks of their subsequent residues.

BACKGROUND OF THE INVENTION

Shellfish, especially shrimp, is an increasingly popular food category in the western world. In 1998, for example, more than 1.5 billion pounds of crustaceans were consumed in the U.S. alone (U.S. Census Bureau, "Statistical Abstract of the United States: 2000", Table #1160). One of the ever-more popular forms of this class of food is the meat removed from the shell, either raw or cooked. For example, the flesh of crab, crayfish, and lobster, which has been "picked" from the shells, is an increasingly popular commercial category of seafood. However, a major consequence of this growing trend is that the shells, which are de-fleshed at central locations, pose a growing and potentially harmful waste-disposal problem.

It has been estimated that approximately 3.2 million metric tons of crustacean shells were produced by processing plants, worldwide, in 1999. This poses not only environmental and health hazards, but it is also a significant waste of the value represented by the chitin contained in all wasted shell material.

Chitin is a naturally occurring polymer that has great commercial utility and significant economic value. For example, chitin has been found to be particularly useful for the production of chitosan, which is useful in the treatment of municipal water, and as a raw material for the production of glucosamine, which is the nutritively important monomer of chitin.

Evident of the usefulness of natural chitin, there are currently many known methods of extracting the natural chitin from the exoskeletons of marine crustaceans. References illustrative of the prior art methods of separating, extracting and purifying the chitin from shellfish wastes include:

Chang & Tsai, 1997, "Response Surface Optimization and Kinetics of Isolating Chitin from Pink Shrimp Shell Waste", J. Agric. Food Chem., Vol. 45, pgs 1900–1904;

Kawaguti, '62, "Electron Microscopy of the Integumental Structure and its Calcification during Molting in a Crayfish", Biol. J. Okayama, Univ., Vol. 8, pp. 43–58;

No & Myers, 1995, "Preparation and Characterization of Chitin and Chitosan—A Review, J. Aquatic Food Product Technol. Vol. 4, #2, pp 27–41;

Roer & Dillamen, 1984, "The Structure and Calcification of the Crustacean Cuticle", Amer. Zool., Vol. 24, pp 893–909;

Waterman, T. H. '60, "Metabolism and Growth", Vol. 1 in "The Physiology of Crustacea", Acad. Press, p. 449, as cited in U.S. Pat. No. 4,199,496, Col. 3.

U.S. Pat. Nos. 4,066,735, 4,199,496, 4,293,098, 5,053,113, 5,210,186;

Japan Patent No. 5,310,804; and

WO Patent No. 8,606,082.

In general, the shells of exoskeleton animals, such as shrimp, have been reported to consist of a matrix of chitin, to which protein is covalently bonded (Chang and Tsai, 1997). This chitin/protein complex is reported to be 'filled' with unwanted fine granules of calcium carbonate (e.g. Roer and Dillamen, 1984, and U.S. Pat. No. 4,199,496). The extent of 'filling' appears to be characteristic for each crustacean species and thus varies. Furthermore, there is also a variable amount of unwanted lipids associated with these exoskeleton matrices, and these lipids are primarily in the form of a lipo-protein membrane, especially the epicuticle (Roer and Dillamen, 1984).

As such, to be functionally useful, the chitin must be effectively separated from these unwanted non-chitinous materials, specifically the lipids, protein, and calcium carbonate. However, since chitin is insoluble in virtually everything except highly concentrated acidic solutions, the conventional practice is to remove the unwanted non-chitinous contaminants from the insoluble chitin matrix by using strong, and environmentally hazardous, acidic solutions.

Prior art efforts to accomplish this separation have utilized chemicals and chemical procedures including boiling lye (U.S. Pat. No. 5,210,186); alkali with constant electrical current (U.S. Pat. No. 5,053,113); sulphurous acid (U.S. Pat. No. 4,066,735); sodium hydroxide, followed by hydrochloric acid (No and Myers, 1995; see also U.S. Pat. No. 4,199,496); de-mineralization by acid, followed by de-proteination by enzymic activity of fish viscera (WO Patent No. 8,606,082); and de-mineralization by acid and de-proteination by soap (Japan Patent No. 5,310,804).

However, such chemicals and solutions are not only costly, but they also present extreme occupational hazards for workers and create environmental dangers due to subsequent handling and waste disposal. Furthermore, regardless of the separation means used to remove these unwanted contaminants from the natural chitin, residues of these harmful chemicals and solutions will remain in the final chitin product, wherein a majority of these chemical residues are believed to be hazardous to human and animal health. As such, the residual chemical presence is at odds with the main purpose of final chitin usages, which include promoting human health. The present invention overcomes these limitations by drastically reducing the reliance and need to use harmful chemicals and/or solutions to remove unwanted chitin contamination. As such, with the present invention, due to the fact that little or no chemical solutions are required, residual chemical presence in the final chitin product is kept to a minimum, thus increasing the healthful usefulness of the end chitin product.

The recovery of chitin from shellfish exoskeletons without chemicals was first disclosed by U.S. Pat. No. 4,293,098 ('098), issued to Muralidhara, using the purely mechanical steps of drying, grinding, and air classification. However, a limitation of the '098 patent is that the requirement of drying the whole shell offal is very demanding of energy, and therefore costly and inefficient. Also, when dried, the chitin matrix becomes lithified to the point that it can best be described as vitreous in nature, and thus much more difficult to cut or grind. Furthermore, it is apparent that when dried ab initio, the protein and lipid contaminants become bound to the chitin, and to each other, making them much more resistant to subsequent separation. This binding of protein and lipid to the chitin is most often described as being chemical in nature (e.g. No and Meyers, 1995, p. 37). Research has been formed and it is most likely a case of tenacious adhesion, as when a dirty cooking pot is allowed to become dry before washing. Whatever the cause, the result is the same: drying the whole shell offal makes the subsequent removal of non-chitinous materials very difficult and inefficient. Pre-drying in this manner, particularly if done, for example, with a rotary kiln or the like, is further likely to result in the production of undesirable thermal decomposition by-products, particularly the protein and lipid, which will need to be eliminated later at considerable cost.

Furthermore, the '098 patent fails to specify how much undesirable residual lipid and calcium remain in the product after final air classification to separate and extract the desired chitin product. In practice, it has been found that this practice of drying the whole offal in fact makes the desired chitin size-reduction and separation much more difficult, and thus more complicated and expensive. Furthermore, it has been observed that the drying of whole shell offal is impractical to conduct on-site at individual peeling or picking facilities, due to energy and machinery requirements, and therefore considerations of economy and efficiency necessitate that this offal be accumulated and stored until it is efficient to transport it to a central drying facility. This required storage increases the cost of the process, and leaves the waste material vulnerable to deterioration and contamination by insects, rodents, birds, and bacteria. All such contamination either reduces the quality of the chitin extracted, and/or increases its cost by requiring eventual clean-up. The present invention overcomes these limitations by negating the need for a drying phase prior to cutting the chitin. Furthermore, the preferred embodiment of the present invention is intended to be conducted on a small scale, whereby having minimal energy and machinery requirements, and where the process can occur at individual peeling or picking facilities, thus negating the requirement that the whole shell offals are kept in a holding container, wherein susceptible to contamination.

OBJECTS OF THE PRESENT INVENTION

It is therefore an object of the present invention to provide an improved and more economical method of separating and extracting chitin from shellfish exoskeletons without the need for harmful and dangerous chemicals and solutions.

It is a further objective of the present invention to provide a method for extracting chitin that is essentially free of objectionable chemical residues and is more suitable for the use in producing safe and healthy food and medical products.

It is still a further object of the present invention to provide a chitin extraction process that has no chemical exposure risk for workers, and no chemical residuals that could pose a disposal and handling risk to the environment.

It is yet another object of the present invention to provide a means of extracting chitin which avoids the necessity of drying the shellfish offal in its whole shell form.

Numerous other objects, features, and advantages of the present invention will become more readily apparent through the following detailed description of the preferred embodiment of the present invention, drawings and the claims.

SUMMARY OF THE PRESENT INVENTION

The present invention is a physical method of efficiently extracting chitin from the exoskeletons of marine crustaceans. The present invention preferably cuts the chitin-rich exoskeletons while the exoskeletons are in a wet state. It is within this wet state that the exoskeletons are apparently softer and have a decreased chance of unwantedly wearing the cutting surfaces. As well, the shells have a reduced chance of fracturing, thereby yielding a more controllable cutting process. Upon cutting the exoskeletons into a predetermined particle size, the exoskeleton particles are then diluted, preferably in a water-based solution, which enhances the exoskeleton's pumping capabilities, as well as provides for a means of washing the cut exoskeletal material.

The diluted and washed particles are then filtered, thus separating the larger (mostly chitinous) particles from the smaller (mostly non-chitinous) particles and water. The exoskeleton material is once again reduced in particle size even further, diluted and mixed, preferably with a water solution, and finally separated again using a filtering means. The final exoskeletal residue is fully washed and subsequently has an approximate chitin concentration of up to 65%, as well as an almost complete reduction of lipids and protein and minimal calcium contamination.

BRIEF DESCRIPTION OF THE DRAWINGS

The preferred embodiment is herein described in detail with references, where appropriate, to the drawing wherein.

DETAILED DESCRIPTION OF THE INVENTION

Figure 1:
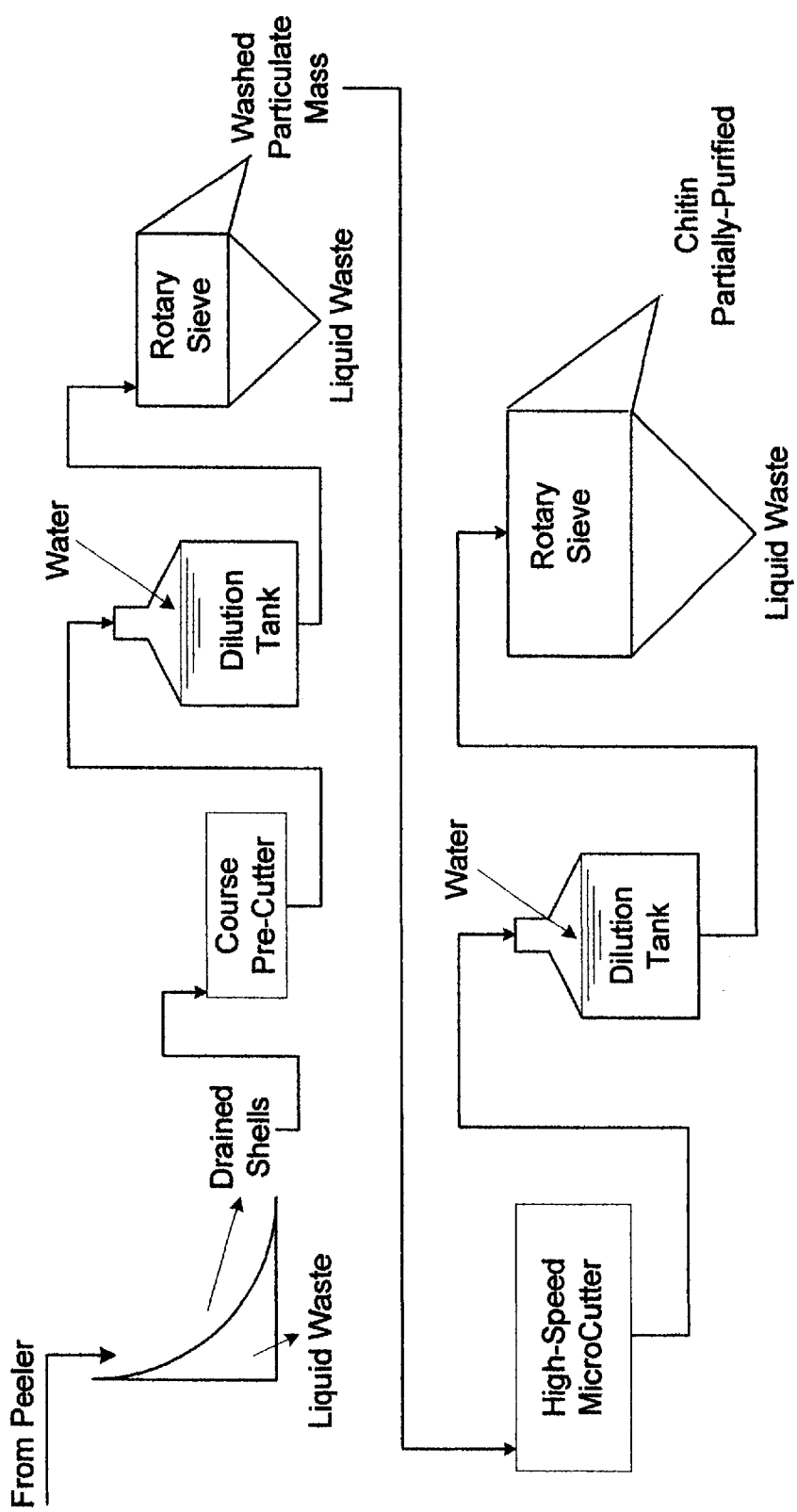
FIG. 1 is a schematic representation of the process of the present invention.
Figure 2:
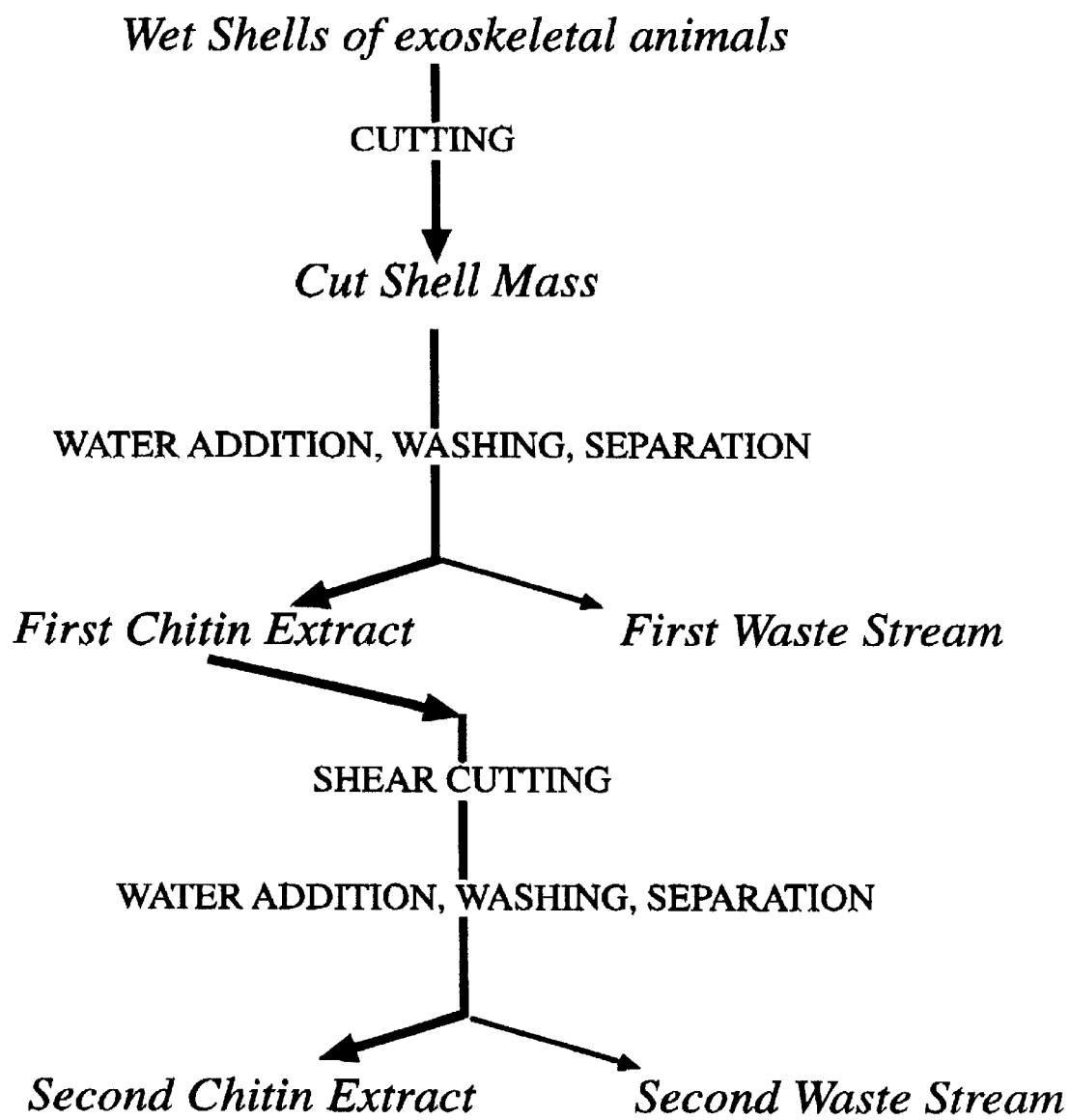
FIG. 2 is a flow chart schematic representation of the inventive process.

While the invention, as schematically depicted in FIGS. 1 and 2, is susceptible of embodiment in many different forms, there will be described herein preferred and alternate embodiments of the present invention. It should be understood and noted, however, that the below disclosure is to be considered an exemplification of the principles of the present invention and is not intended to limit the true spirit and scope of the present invention and/or claims of the embodiments illustrated herein.

It has been determined that if the exoskeletons of marine crustaceans are treated and extracted promptly, and most importantly in a wet state, they can easily be cut (rather than ground) into a very small particle size, preferably less than ¼ of an inch. Furthermore, it has been determined that when finely cut in this manner, the inherent protein, fat and much of the calcium can be separated and removed by simple washing the cut whole exoskeletal offals with water, thus becoming a first chitin extract. By achieving this goal without the need for any of the harsh and dangerous chemicals utilized and taught in the prior art, the final chitin product is low in residual chemical contamination.

In the preferred embodiment of the present invention, cutting in the wet state has been found to be surprisingly easier than either cutting or grinding the shell material after it has been dried, as taught by the prior art. It is believed that this is a consequence of the more flexible and relatively plastic nature of the wet chitin matrix contained within the exoskeleton. By expediently fine-cutting the wet exoskeletal material, it becomes a relatively efficient and simple matter to separate the protein, lipids, and a majority of the calcium from the chitinous particles by simply washing with water.

Thus, by avoiding the preliminary step of drying of the whole shell offal, such as in the manner taught by the '098 patent, the preferred embodiment of the present invention readily and freely removes unwanted contaminants from the insoluble chitinous matrix.

In the preferred embodiment of the present invention, exoskeletons, which have been peeled from crustaceans, are promptly subjected to high-speed cutting, yielding fairly uniform particles, preferably about 1/16 inch to 1/4 inch in size. In the preferred embodiment, the cut exoskeletal material is then diluted and mixed with water in a ratio of about 1:5 to about 1:30. However, alternate embodiments can utilize any aqueous solution and mix at different ratios. As such, it should be noted that the ratios herein disclosed should not be construed as limiting, but rather as an exemplification of the preferred embodiment. In the preferred embodiment, the particles of chitinous and other materials are distributed in the dilution solution by simple mixing, thus forming a pumpable slurry.

This pumpable slurry is then pumped to a filtering means. The preferred embodiment uses an agitated sieving device with a fine-mesh (typically 800 microns) screen, in which substantially all of the added water is separated from the solid chitinous residue which has thereby been concentrated in chitin content. By this means, a substantial amount of the unwanted contaminant materials are removed, along with most of the diluting solution. As an enhanced feature of the preferred embodiment, the bacterial load remaining in the resulting material is significantly reduced because it is carried away with the other unwanted materials. Further, since the cutting, subsequent dilution, and initial separation of solids takes place early in the process, preferably at or near the shellfish processing site, bacterial loads are not allowed to increase as much as in conventional practice.

In the preferred embodiment, the separated slurry, now consisting of partially purified chitinous particles, is once again diluted and mixed, preferably with water and preferably to about the same mixture ratios as mentioned above, to form a second concentrated slurry. The particles within this second chitinous slurry of the preferred embodiment are further reduced in size, preferably by being passed through a high-speed impact cutting device, which reduces the particle size, preferably to an average of about 70 microns in size. Alternately, the partially purified chitinous particles can be reduced in size to approximately 200 microns, diluted with an aqueous solution at an approximate ratio as stated above, and separated with a filtering means prior to once again being diluted and mixed and cut to approximately 70 microns as stated within the preferred embodiment.

This resultant finely-cut, and once-washed second chitinous slurry is then filtered using a final filtering means. The preferred embodiment of the present invention pumps the second slurry to an agitated sieve with a 200 mesh (approximately 70 micron) screen. It should be noted, however, that alternate embodiments may utilize different sieve size screens. By using this means, substantially all of the newly added diluting solution, and most of the diluting solution remaining from the initial washing of the first slurry, is removed. This final filtering means also carries away most of the remaining increments of the finely dispersed protein and lipids, as well as a majority of the small calcium granulites. The preferred embodiment subsequently extracts an approximately 65% pure chitin product. As an alternate embodiment of the present invention, the resultant chitin product can be further diluted with an aqueous solution and separated with filtering means after the final filtering means to create a more purified chitin product.

The resultant washed and purified chitin of the preferred embodiment is then dried in any suitable dryer. Since the purified chitin is now resistant to thermal degradation, a simple dryer can be used without risking damage to this valuable chitin material. The drying required by this process, by being performed only on the purified chitin, saves further costs. Since the chitin represents only about 15% to 24% of the original weight of shell offal, and consequently carries a concomitantly smaller burden of water, the drying cost will be only about one-fourth of the cost incurred by prior art processes.

Furthermore, by means of the process steps contained in the preferred embodiment, it has been found that both the calcium and the protein in the remaining chitinous mass are significantly reduced, and the lipids have been eliminated almost completely. All of this is accomplished at a loss of only a very small fraction of the natural chitin (see Table 1 below).

It is also important to note that in the preferred embodiment, it has been found that the several contaminants of the crustacean shells seem to be significantly changed by the cutting processes in very different ways. It is believed that these differences are a consequence of the very different physical properties of these contaminants. For example, the protein, being highly hydrated and relatively soft, suffers the greatest size reduction.

The resultant extracted chitin, being a dense, resilient, insoluble, and only slightly hydrated polymer, is cut to a fairly uniform size, having a microscopic appearance of shattered glass. The exact dimensions of these fine shards of chitin depend upon the specification of the cutting device employed.

The residual contaminant calcium, being present as very small, dense, spheroidial crystallites (Waterman. '60, Kawaguti, '62), experiences little, if any, size reduction. However, most of the calcium granules and aggregates appear to be freed from the chitin matrix by means of the final cutting operation in the preferred embodiment. It is also possible that a substantial percentage of aggregates of calcium crystallites are shattered by the preferred impact cutting process. In either case, by being so liberated from the chitin matrix, they are then easily separated from the coarser, flaky chitinous shards by the preferred final diluting and filtering operations.

The lipid material contaminants seem to become attached to the protein, and to some of the finer chitin film fragments. These also apparently separate readily with each filtering means.

In the preferred embodiment as described herein, it has been found that the means of size-reduction is most easily accomplished by using a cutting means rather than a grinding device, as is customarily practiced in all of the prior art. It is believed this is true because the grinding actions specified by the prior art smears and compresses the protein and lipids into the interstices of the chitin matrix during the course of reducing the size of the exoskeletal material. This further increases the difficulty and inefficiency of subsequent chitin extraction as practiced in the prior art. Whereas when a true cutting action is employed, which is feasible with exoskeletons in a wet state, there is little smearing action. Furthermore, the size of all contaminants is reduced 'cleanly', i.e. with minimal 'smearing' action. This makes subsequent separation easy and efficient, as can be seen from the following data for the resultant crude chitin composition (Table 1).

TABLE 1

Crude Chitin Composition

| Component | Initial (% bds) | Initial (Wt. Chitin) | Final (% bds) | Final (Wt. Chitin) | Reduction (%) |
|---|---|---|---|---|---|
| Chitin | 17.42 | 100.0 | 60.00 | 100.0 | 0.0 |
| Calcium | 18.43 | 105.8 | 16.00 | 26.7 | 74.8 |
| Protein | 35.71 | 205.0 | <1.00 | 1.7 | 99.2 |
| Lipid | 0.81 | 5.6 | <0.05 | 0.08 | 98.2 |

Table 1 represents typical chitin yields derived from shrimp exoskeletons and inherent contamination concentrations when using the preferred embodiment of the present invention.
TABLE NOTES:
1. Calcium is primarily present as $CaCO_3$; consequently, the numbers do not add to 100%
2. "bds" indicates "bone dry solids".
3. While the above table specifically refers to shrimp, it is not intended to limit the present invention to shrimp alone.

The resultant chitinous product specified in Table 1 can now be easily depleted in both calcium and residual protein by means and methods well know to the art, if further chitin purification is desired. However, by utilizing the preferred embodiment as disclosed herein, a significantly smaller amount of the usual chemical reagents will be required, as the bulk of the extraction has already been successfully accomplished. For example, only about 1% of the amount of base will be required to deplete the residual protein remaining in the chitin produced by the preferred embodiment of the present invention. This has the further benefit of producing a much lower level of inadvertent de-acetylation. Furthermore, only about 25% of the acid specified by the prior art will be required to deplete the resultant chitin of the residual calcium contaminant. As such, residual chemical contamination is kept to a minimum.

It has also been found that the resultant small median size of the chitinous particles considerably facilitates the removal by acid of the remaining calcium. As well, it has been found that it is not necessary to dehydrate the mass of chitinous particles prior to de-calcification. The resultant chitin mass, which has been de-watered via the preferred 200-mesh screen, as described above, is simply mixed with the volume of acid calculated to be required to convert all of the $CaCO_3$ to $CaCl_2$. The resultant acidified slurry is further agitated to promote the desired conversion. Agitation is continued until about 10 minutes after the slurry has ceased to generate $CO_2$, commonly in the form of froth. The converted slurry is pumped to the same sort of agitated fine screening device as described in the preferred embodiment above. This allows the $CaCl_2$ solution to be conveniently and easily separated from the chitin product.

By operating this fine screening device with an excess of 'back-washing' water flow, residual, entrained $CaCl_2$ solution is simply washed away. The de-watered 'cake' exiting the screening device is wet, purified chitin, which is the desired product of the present invention (see Table 2).

TABLE 2

Purified Chitin Composition

| Component | (%) |
|---|---|
| Chitin | >98.50 |
| Calcium | <1.00 |
| Protein | <0.50 |
| Lipid | <0.05 |
| TOTAL | 100.00 |

Table 2 describes the typical composition of the chitin and related contaminants after final purification utilizing common de-calcification techniques subsequent to the process described in the preferred embodiment.

It has also been found that if further de-calcification is desired after utilizing the extraction method as described in the preferred embodiment, not only does it demand less acid than that specified by the prior art, but it also requires less time. For example, according to No and Meyer (1995), about 10 volumes of HCl (2.5% to 8% solution) is required to de-mineralize a unit weight of shrimp exoskeletal material in one to eight hours at ambient temperature. However, it has been found that the residual calcium content of the chitinous material produced by the preferred embodiment described herein, can be essentially fully depleted by only about one-third the amount of acid, in about only ½ to 1 hour at ambient temperature.

This significantly-reduced acid usage and reliance has the further advantage of reducing the risk of de-polymerizing the chitin, a risk specifically referenced by No and Meyers (1995).

Where it is desired to conduct the further de-calcification and drying at a central site, remote from the peeling and picking operations, this can be easily accomplished without incurring microbiological risk, and at no further chemical cost. This is accomplished by simply acidifying the wet chitinous mass with sufficient HCl to lower the pH to a point whereat microbial growth is obviated, but which is not low enough to initiate de-calcification (pH about 4.0). Thus, resultant solution will be stabilized against microbial action during transport by using a portion of the acid, which would, in any case, be required for complete de-calcification.

It has been further found that chitin extracted from the preferred embodiment of the present invention which has been partially acidified for transportation stabilization purposes is much more dense than the whole offal and can thus be transported at much lower cost, as well as being more secured against microbial and bacterial contamination. This chitinous material represents less than 30% of the weight, and is almost twice the density, of the whole offal material. Thus, in a weight comparison containing an equal amount of chitin material, the preferred embodiment's resultant chitin extract occupies only about one-seventh the volume. By being so compact, it is practical to transport it in covered containers, thus obviating contamination at this point.

The foregoing specification describes only the preferred and alternate embodiments of the invention as shown. Other embodiments besides the above may be articulated as well. The terms and expressions therefore serve only to describe the invention by example only and not to limit the invention. It is expected that others will perceive differences, which while differing from the foregoing, do not depart from the spirit and scope of the invention herein described and claimed.

We claim:

1. A mechanical purification method of extracting chitin by removing contaminant material without the use of chemicals from non-dried shells of exoskeletal animals, the shells having a moisture content of greater than 70%, comprising the steps of:
   a. shear force cutting said shells to produce a first mass of cut shell particles having an average particle size of about 800 microns or less;
   b. diluting and mixing said first mass of cut shell particles with water to create a first pumpable slurry having a moisture content of over 85 percent; and
   c. separating by de-watering said diluted first mass of cut shell particles from said first pumpable slurry to produce a first chitin extract created by the washing away of contaminant material from the diluted first mass of cut shell particles during the separating process.

2. The method as claimed in claim 1, wherein said mass of cut shell particles is diluted with said water at a ratio from approximately 1:5 by weight to approximately 1:30 by weight.

3. The method as claimed in claim 1, wherein the step of separating said mass of cut shell particles from said first pumpable slurry thereby creating the de-watered first chitin extract, is done by pumping said first pumpable slurry through a first filtering means.

4. The method as claimed in claim 3 wherein said first filtering means comprises a first screen filter.

5. The method as claimed in claim 4 wherein said first screen filter has a mesh size of approximately 800 microns.

6. The method as claimed in claim 1, further comprising the steps of:
   a. diluting and mixing said first chitin extract with water to create a second pumpable slurry having a moisture content of over 85 percent;
   b. reducing said average particle size of the mass of cut shell particles in said second pumpable slurry by shear force cutting said diluted first chitin extract to create a second mass of cut shell particles having an average particle size of about 70 microns or less; and
   c. separating by de-watering said second mass of cut shell particles from said second pumpable slurry thereby creating a second chitin extract created by the washing away of additional contaminant material from the second mass of cut shell particles during the separating process, wherein said second chitin extract has less contaminant material than said first chitin extract, and wherein lipid and protein contaminant material is reduced by at least 95 percent from originally present with said shells of exoskeletal animals by said cutting, washing with water and de-watering steps.

7. The method as claimed in claim 6, wherein the step of separating by de-watering said second mass of cut shell particles from said second pumpable slurry is done by pumping said second pumpable slurry through a second filtering means.

8. The method as claimed in claim 7 wherein said second filtering means comprises a second screen filter.

9. The method as claimed in claim 8 wherein said second screen filter has mesh size of approximately 30 microns.

10. A mechanical purification process for extracting chitin by removing contaminant material without the use of chemicals from non-dried shells of exoskeletal animals, the shells having a moisture content of greater than 70%, comprising the steps of:
    shear force cutting said shells to produce a first mass of cut shell particles having an average particle size of about 800 microns or less;
    washing said first mass of cut shell particles with water by diluting and mixing said first mass of cut shell particles with said water to form a slurry having a moisture content of over 85 percent; and
    de-watering said formed slurry to produce a de-watered first chitin extract created by the washing away of contaminant material during the de-watering step.

11. The process according to claim 10, wherein the cut shell particles are diluted with said water at a ratio of about 1:4 by weight to about 1:30 by weight.

12. The process according to claim 10, wherein de-watering said formed slurry is done with filtering means.

13. The process according to claim 12, wherein the filtering means is a screen filter.

14. The process according to claim 13, wherein the screen filter has a mesh size of about 800 microns.

15. The process according to claim 10, further comprising the steps of:
    reducing the particle size of the first mass of cut shell particles by shear force cutting said first chitin extract to produce a second mass of cut shell particles having an average particle size of about 70 microns or less;
    washing said second mass of cut shell particles by diluting and mixing said second mass of cut shell particles with water to form another slurry;
    and de-watering said formed other slurry,
    wherein a de-watered second chitin extract is separated from the other slurry for further processing, the second chitin extract having less contaminant material than the first chitin extract, and wherein lipid and protein contaminant material is reduced by at least 95 percent from originally present with the shells of exoskeletal animals by said cutting, washing with water and de-watering steps.

16. The process according to claim 15, wherein de-watering said other slurry is done with filtering means.

17. The process according to claim 16, wherein the filtering means is screen filter.

18. The process according to claim 17, wherein the screen filter has a mesh size of about 30 microns.

19. A mechanical purification process for extracting chitin by removing contaminant material without the use of chemicals from non-dried shells of exoskeletal animals, the shells having a moisture content of greater than 70%, comprising the steps of:
    shear force cutting said shells to produce a mass of cut shell particles having an average particle size of about 800 micron or less;
    washing said mass of cut shell particles with water by diluting and mixing said mass of cut shell particles to form a first slurry having a moisture content of over 85 percent, and processing said first slurry such that a majority of the contaminant material is separated from the mass of cut shell particles, wherein the washed and separated mass of cut shell particles comprise a first chitin extract;
    reducing the average particle size of the washed mass of cut shell particles by shear force cutting said washed mass of cut shell particles to produce a second mass of cut shell particles having an average particle size of about 70 microns or less; and
    washing said second mass of cut shell particles with water by diluting and mixing said second mass of cut shell particles with said water to form a second slurry and processing said second slurry such that a majority of other contaminant material is separated from the second mass of cut shell particles, wherein the washed and separated second mass of cut shell particles comprise a second chitin extract, which is purer than the first chitin extract.

20. The process according to claim 19, wherein the cut shell material is diluted with said water at a ratio of about 1:4 by weight to about 1:30 by weight.

21. The process according to claim 19, wherein the first chitin extract is separated using filtering means.

22. The process according to claim 21, wherein the filtering means is a screen filter.

23. The process according to claim 22, wherein the screen filter has a mesh size of about 800 microns.

24. The process according to claim 19, wherein the second chitin extract is separated using filtering means.

25. The process according to claim 24, wherein the filtering means is screen filter.

26. The process according to claim 25, wherein the screen filter has a mesh size of about 30 microns.

* * * * *